United States Patent
Takada et al.

(10) Patent No.: US 6,207,327 B1
(45) Date of Patent: Mar. 27, 2001

(54) TOTALLY-SOLID LITHIUM SECONDARY BATTERY

(75) Inventors: Kazunori Takada, Osaka; Kazuya Iwamoto, Sakai; Shigeo Kondo, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/290,163

(22) Filed: Apr. 13, 1999

(30) Foreign Application Priority Data

Apr. 15, 1998 (JP) .................................................. 10-104469

(51) Int. Cl.$^7$ ..................................................... H01M 6/18
(52) U.S. Cl. ........................... 429/304; 429/221; 429/223; 429/224; 429/231.1; 429/231.2; 429/231.3; 429/231.5; 429/231.95
(58) Field of Search ..................................... 429/304, 221, 429/223, 224, 231.1, 231.2, 231.3, 231.5, 231.95

(56) References Cited

U.S. PATENT DOCUMENTS

| | | | |
|---|---|---|---|
| 4,302,518 | 11/1981 | Goodenough et al. | 429/104 |
| 4,983,476 | 1/1991 | Slane et al. | 429/197 |
| 5,154,990 | 10/1992 | Plichta et al. | 429/191 |
| 5,260,147 | 11/1993 | Delmas et al. | |
| 5,284,721 | * 2/1994 | Beard | 429/218.1 |

OTHER PUBLICATIONS

Takada K. et al: "Lithium iron sulfide as an electrode material in a solid state lithium battery" Solid State Ionics, vol. 117, No. 3–4, Feb. 2, 1999, pp. 273–276 XP004154434.
European Search Report dated Jul. 29, 1999.
Brec, et al., "Chemical and Electrochemical Study of the $Li_xFeS_2$ Cathodic System ($0<x\leq2$)," Mat. Res. Bull., Mar. 10, 1980, vol. 15, pp. 619–625.
Murphy, et al., "Low Voltage Behavior of Lithium/Metal Dichalcogenide Topochemical Cells," Journal of the Electrochemical Society: Electrochemical Science and Technology, Mar. 1979, vol. 126, pp. 349–351.
Preto, et al., "Reactions of $FeS_2$, $CoS_2$, and $NiS_2$ Electrodes in Molten LiCl–KCL Electrolytes," Journal of the Electrochemical Society: Electrochemical Science and Technology, Feb. 1983, vol. 130, pp. 264–273.

* cited by examiner

Primary Examiner—Laura Weiner
(74) Attorney, Agent, or Firm—Stevens, Davis, Miller & Mosher, LLP

(57) ABSTRACT

A totally-solid lithium secondary battery can be improved in charge and discharge characteristics by adding to the negative electrode a first transition metal chalcogenide or lithium•transition metal chalcogenide which acts as the active material for negative electrode and a second transition metal chalcogenide or lithium•transition metal chalcogenide which inhibits precipitation of metallic lithium.

14 Claims, 1 Drawing Sheet

TOTALLY-SOLID LITHIUM SECONDARY BATTERY

BACKGROUND OF THE INVENTION

1. Field of the Invention

The present invention relates to a totally-solid lithium secondary battery which uses a lithium ion conductive solid electrolyte as an electrolyte, and a transition metal chalcogenide or a lithium•transition metal chalcogenide as an active material for negative electrode.

2. Description of Related Art

With recent development of portable equipment such as personal computers, portable telephones, etc., demand for batteries as electric sources thereof much increases. Particularly, lithium batteries are intensively investigated in various fields as batteries capable of providing high energy density because lithium has a small atomic weight and has a large ionization energy.

As active materials for electrodes used in lithium batteries, for example, iron disulfide performs a four-electron reaction as shown in the following formula 1, and shows a high theoretical capacity density of 894 mAh/g.

$$FeS_2 \leftrightarrows Li_3Fe_2S_4 \leftrightarrows Li_{2+x}Fe_{1-x}S_2+Fe_{1-x}S \leftrightarrows Li_2FeS_2 \leftrightarrows Li_2S+F \qquad 1$$

Moreover, when the transition metal element is cobalt or nickel, the four-electron reactions shown in the following formulas 2 and 3 also take place, and a high theoretical capacity density is obtained.

$$CoS_2 \leftrightarrows Co_3S_4 \leftrightarrows Co_xS_9 \leftrightarrows Co \qquad 2$$

$$NiS_2 \leftrightarrows NiS \leftrightarrows Ni_7S_6 \leftrightarrows Ni_3S_2 \leftrightarrows Ni \qquad 3$$

However, reversibility of these reactions is low, and is insufficient for practical secondary batteries.

BRIEF SUMMARY OF THE INVENTION

Concerning these problems, the inventors have found that when a lithium ion conductive solid electrolyte is used as an electrolyte for the electrode reaction of the transition metal chalcogenides, the reaction of the transition metal element being reduced to metal does not take place, and the electrode reaction takes place reversibly. The inventors have further found that precipitation of metals at the interface of the solid electrolyte can be inhibited by adding to negative electrode at least two compounds, namely, (a) at least one first transition metal chalcogenide or lithium•transition metal chalcogenide and (b) at least one second transition metal chalcogenide or lithium transition metal chalcogenide.

The object of the present invention will be explained below. For simplification of the explanation, $Li_2FeS_2$ is taken as an example of the lithium•transition metal chalcogenide which is an active material for negative electrode.

The negative electrode reaction at the time of charging of a totally-solid lithium secondary battery which uses $Li_2FeS_2$ as an active material for negative electrode is shown by the following formula 4.

$$Li_2FeS_2+xLi^+xe^- \leftrightarrows Li_{2+x}FeS_2 \qquad 4$$

On the other hand, when the battery is operated at a current greater as compared with the reaction rate of the formula 4, the reaction of the formula 5 also takes place competitively.

$$Li^++xe^- \leftrightarrows Li \qquad 5$$

When this reaction predominantly takes place, metallic lithium is precipitated at the interface between $Li_2FeS_2$ and the solid electrolyte. If metal is precipitated at the interface, bonding between $Li_2FeS_2$ particles and the solid electrolyte is weakened. As a result, due to the decrease of the area of the reaction interface, the reaction of the formula 4 becomes further difficult to take place, and the reaction for precipitation of metallic lithium shown by the formula 5 takes place more predominantly. Finally, separation between $Li_2FeS_2$ and the solid electrolyte occurs, and there is the possibility of no normal charge and discharge characteristics being exhibited.

The present invention solves the above problems, and the object of the present invention is to provide a rechargeable lithium secondary battery which uses a transition metal sulfide as an active material for negative electrode. Other objects of the present invention will be readily apparent from the following description of the invention.

DETAILED DESCRIPTION OF THE INVENTION

Figure 1:
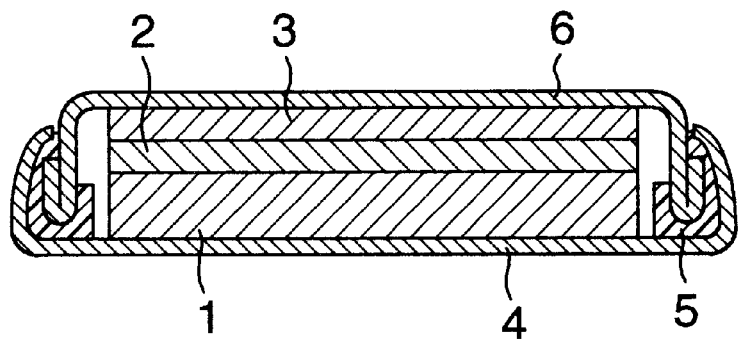
FIG. 1 is a sectional view of the totally-solid lithium secondary battery in one example of the present invention.

For easy understanding of the present invention, the following explanation will be given on an example of using $Li_2FeS_2$ as the first lithium•transition metal chalcogenide and $LiTiS_2$ as the second lithium•transition metal chalcogenide.

As for the negative electrode reactions at the time of charging of a totally-solid lithium secondary battery which uses a negative electrode containing $LiTiS_2$ in addition to $Li_2FeS_2$, the reaction of the following formula 6 can take place in addition to the reactions of the above formulas 4 and 5.

$$LiTiS_2+xLi^+xe^- \rightarrow Li_{1+x}TiS_2 \qquad 6$$

Since the potential of this reaction is about 0.5 V which is lower than that of the reaction of the formula 4 (about 1.6 V in terms of lithium), this reaction takes place in advance of the precipitation reaction of metallic lithium shown by the formula 5 in the case of the strength of charging current exceeding the reaction rate of the formula 4. Moreover, the reaction rate of the formula 6 is considerably high, and as a result, the reaction of the formula 5 hardly takes place in the practical charging operation of the totally-solid lithium secondary battery, and precipitation of metallic lithium can be effectively inhibited.

As a result, a totally-solid lithium secondary battery excellent in charge and discharge characteristics can be provided when it comprises a positive electrode, an electrolyte mainly composed of a lithium ion conductive inorganic solid electrolyte, and a negative electrode containing (a) at least one first transition metal chalcogenide or lithium•transition metal chalcogenide and (b) at least one second transition metal chalcogenide or lithium•transition metal chalcogenide, and oxidation-reduction potential of said second transition metal chalcogenide or lithium•transition metal chalcogenide is lower than that of said first transition metal chalcogenide or lithium•transition metal chalcogenide in the operation of charging and discharging of the totally-solid lithium secondary battery.

Furthermore, since LiTiS$_2$ is a mixed conductor of lithium ion and electron, it also has actions to enhance lithium ion conductivity and electron conductivity in negative electrode, improve the reaction rate of the formula 4, and inhibit the precipitation of metallic lithium. In this example, explanation is given using LiTiS$_2$ as the second lithium•transition metal chalcogenide, but when TiS$_2$ is used in place of LiTiS$_2$, the local battery reaction shown by the formula 7 also takes place, and the resulting Li$_x$TiS$_2$ shows the electron-lithium ion mixed conductivity.

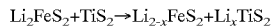

$$Li_2FeS_2 + TiS_2 \rightarrow Li_{2-x}FeS_2 + Li_xTiS_2 \qquad 7$$

As a result, a totally-solid lithium secondary battery excellent in charge and discharge characteristics can be obtained when it comprises a positive electrode, an electrolyte mainly composed of a lithium ion conductive inorganic solid electrolyte, and a negative electrode containing (a) at least one first transition metal chalcogenide or lithium•transition metal chalcogenide and (b) at least one second transition metal chalcogenide or lithium•transition metal chalcogenide, and said first transition metal chalcogenide or lithium•transition metal chalcogenide performs an oxidation-reduction reaction and said second transition metal chalcogenide or lithium•transition metal chalcogenide shows a mixed conductivity of electron-lithium ion in the operation of charging and discharging of the totally-solid lithium secondary battery.

As explained above, the second transition metal chalcogenide or lithium•transition metal chalcogenide has an action to increase the electrode reaction rate of the first transition metal chalcogenide or lithium•transition metal chalcogenide. It is the first transition metal chalcogenide or lithium•transition metal chalcogenide that acts as a substantial active material for electrode. Therefore, the first transition metal chalcogenide or lithium•transition metal chalcogenide must have a high capacity density. Thus, iron, cobalt or nickel which performs 2–4 electron reactions per a transition metal element is preferred as the transition metal element used in the first transition metal chalcogenide or lithium•transition metal chalcogenide. Among them, iron is especially preferred because it is cheap and rich in resources.

The second transition metal chalcogenide or lithium•transition metal chalcogenide must satisfy the above-mentioned requirement of the oxidation-reduction potential with relation to the first transition metal chalcogenide or lithium•transition metal chalcogenide. Moreover, as mentioned above, it is preferred that they show a high electron-lithium ion conductivity. As the transition metal elements of the second transition metal chalcogenide or lithium•transition metal chalcogenide which satisfy these requirements, preferred are vanadium, titanium, chromium, molybdenum, niobium and manganese. Titanium is most preferred because it shows a high mixed conductivity.

The formula 8 shows the reaction of iron sulfide in a lithium battery together with the formal charge of iron in the case of the formal charge of lithium being +1 and that of sulfur being −2. As the active material for negative electrode, it is desired to result in a reaction showing a lower potential, and, in the formula 8, it is desirable that the reaction of (2), namely, the reaction in which the formal charge of iron is smaller than +2, takes place.

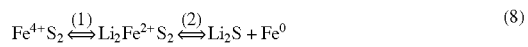

$$Fe^{4+}S_2 \overset{(1)}{\Longleftrightarrow} Li_2Fe^{2+}S_2 \overset{(2)}{\Longleftrightarrow} Li_2S + Fe^0 \qquad (8)$$

However, the above-mentioned precipitation reaction of metallic lithium especially vigorously takes place in the reaction area (2). Therefore, the effect of the present invention is especially great when the lithium iron sulfide is represented by Li$_x$FeS$_y$ (Li: lithium, Fe: iron, S: sulfur, and x and y are numerals corresponding to the compositional ratio of the elements), and when the lithium iron sulfide is deeply reduced until the minimum formal charge (n) of iron during the operation of the totally-solid lithium secondary battery satisfies +2≧n≧0, with a proviso that the formal charge of sulfur is −2 and the formal charge of lithium is +1.

However, the expression Li$_x$FeS$_y$ in this specification is used for convenience' sake. This includes not only the compounds of single phase, but also those having a plurality of crystal phases, a plurality of amorphous phases or a mixture of crystal phase and amorphous phase which has an elemental composition of Li$_x$FeS$_y$ in average value of the mixed state. That is, the expression Li$_3$Fe$_2$S$_4$ is also used for the mixture of FeS$_2$ and Li$_2$FeS$_2$ at a molar ratio of 1:3.

Transition metal elements which show the same electrode reaction as iron sulfide include cobalt, nickel, etc. in addition to iron. The present invention has the similar effect on sulfides, tellurides and selenides of these elements. Therefore, the effect of the present invention is great in case that when the first lithium•transition metal chalcogenide is represented by Li$_x$MeX$_y$ (Li: lithium, Me: at least one selected from iron, cobalt and nickel, X: chalcogen, and x and y are numerals corresponding to the compositional ratio of the elements), the minimum formal charge (n) of the transition metal element during the operation of totally-solid lithium secondary battery satisfies +2≧n≧0, with a proviso that the formal charge of chalcogen is −2 and the formal charge of lithium is +1.

As the chalcogen of the transition metal chalcogenides or lithium•transition metal chalcogenides in the present invention, sulfur is especially preferred because sulfur is lower than selenium or tellurium in toxicity and furthermore weight per equivalent amount can be reduced.

As the lithium ion conductive inorganic solid electrolytes, those mainly composed of sulfide are preferred for the following reasons.

The first reason is that when a sulfide-based solid electrolyte and an oxide-based solid electrolyte are compared, the former shows higher ionic conductivity since sulfur is an element higher than oxygen in polarizability, and, hence, output of the battery can be made greater and charging rate can also be improved.

The second reason is that since the active material for negative electrode used is a chalcogenide, especially, a sulfide, chemical stability against the active material for negative electrode is improved.

Further, the sulfide-based lithium ion conductive solid electrolytes are preferably those which have a bridging oxygen. Inorganic solid electrolytes generally comprise fixed anionic secondary lattice and mobile ion. The anionic secondary lattice is constituted by a covalent bond, and presence of oxygen at bridged site results in strong covalent bond and the structure of the solid electrolytes can be stabilized. On the other hand, when the unbridged site is occupied by sulfur, electrostatic attraction force between the unbridged site and the lithium ion can be reduced as compared with when the unbridged site is occupied by oxygen, and thus lithium ion can be made easy to move. As a result, ionic conductivity of the solid electrolyte is improved, and the battery characteristics can be improved.

As the active material for positive electrode of the lithium secondary battery of the present invention, most preferred is a lithium-containing transition metal oxide for the following reasons.

The negative electrode reaction when iron sulfide (FeS$_2$) is used as the active material for negative electrode is formally shown in the formula 9. In the formula 9, the reaction progressing in the right direction corresponds to the charging reaction of battery and the reaction progressing in the left direction corresponds to the discharging reaction. FeS$_2$ and Li$_2$FeS$_2$ can be chemically synthesized, and batteries can be made using these compounds. On the other hand, the compound formally represented by the composition of Li$_4$FeS$_2$ in the formula 9 has not been found so far, and process for the synthesis of it is not known. Therefore, in making batteries, FeS$_2$ or Li$_2$FeS$_2$ must be used as the active material for negative electrode, and thus the negative electrode of the battery is constructed in discharged state. Therefore, it is preferred that the active material for positive electrode in discharged state is also used together with the said active materials for negative electrode.

When the transition metal element oxide is represented by MeO$_y$, the electrode reaction of the transition metal oxide is generally shown by the formula 10. In the formula 10, the reaction progressing in the right direction is the discharging reaction, and the reaction progressing in the left direction is the charging reaction. Accordingly, in order to satisfy the above conditions, it is preferred to use a lithium-containing transition metal oxide as the active material for positive electrode.

  (9)

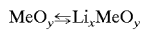  (10)

Similarly, lithium-containing transition metal sulfides such as Li$_x$TiS$_2$ and Li$_x$NbS$_2$ can also be used. However, since the lithium-containing transition metal oxides generally show the higher potential, battery voltage can be increased by using the lithium-containing transition metal oxides, and thus lithium secondary batteries of high energy density can be obtained.

The transition metals used for these lithium-transition metal oxides are preferably at least one selected from the group consisting of cobalt, nickel, manganese, iron and vanadium.

The present invention may also be a sub-combination of these described features.

Having thus generally described the present invention, the following specific examples are provided to illustrate the invention. The examples are not intended to limit the scope of the invention.

EXAMPLES

The present invention will be explained in detail by the following examples.

Example 1

In this example, a totally-solid lithium secondary battery was made in the following manner, using lithium iron sulfide (Li$_2$FeS$_2$) as the first lithium·transition metal chalcogenide and titanium disulfide (TiS$_2$) as the second transition metal chalcogenide for negative electrode, lithium cobalt oxide (LiCoO$_2$) as the active material for positive electrode, and an amorphous solid electrolyte represented by 0.01Li$_3$PO$_4$-0.63Li$_2$S-0.36SiS$_2$ as the sulfide-based lithium ion conductive solid electrolyte. The characteristics of the battery were evaluated.

First, the sulfide-based lithium ion conductive solid electrolyte was prepared in the following manner.

Lithium phosphate (Li$_3$PO$_4$), lithium sulfide (Li$_2$S) and silicon sulfide (SiS$_2$) as starting materials were mixed at a molar ratio of 1:63:36, and the mixture of the starting materials was charged in a glassy carbon crucible. This crucible was put in a horizontal furnace and heated to 950° C. in an argon stream to make the mixture into molten state. After heating for 2 hours, the melt was dropped onto twin rollers and rapidly cooled to obtain a lithium ion conductive solid electrolyte represented by 0.01Li$_3$PO$_4$-0.63Li$_2$S-0.36SiS$_2$. This solid electrolyte was ground to a powder.

Li$_2$FeS$_2$ was prepared by mixing Li$_2$S and iron sulfide (FeS) at a molar ratio of 1:1, charging the mixture in a glassy carbon crucible, melting the mixture at 950° C. in an argon stream, and cooling the melt to room temperature in a furnace. The resulting Li$_2$FeS$_2$, the solid electrolyte powder obtained above, and TiS$_2$ which was a commercially available reagent were mixed at a weight ratio of 45:45:10 to obtain a material for negative electrode.

LiCoO$_2$ was prepared by weighing cobalt oxide (Co$_3$O$_4$) and lithium carbonate (Li$_2$CO$_3$) so as to give a ratio of Co/Li=1, mixing them, and firing the mixture at 900° C. in the air. The resulting LiCoO$_2$ and the solid electrolyte powder were mixed at a weight ratio of 3:2 to obtain a material for positive electrode.

FIG. 1 shows a sectional view of the totally-solid lithium secondary battery A in this example. A positive electrode 1 comprising 105 mg of the material for positive electrode obtained above, a lithium ion conductive solid electrolyte layer 2, and a negative electrode 3 comprising 31 mg of the material for negative electrode obtained above were press molded to make an integral three-layer structure. This integrally molded pellet was put in a battery case 4 made of stainless steel and the case was sealed with a stainless steel lid 6 by means of an insulating gasket 5.

Next, for comparison, a totally-solid lithium secondary battery was made using a material for negative electrode which did not contain TiS$_2$.

That is, a totally-solid lithium secondary battery B was made in the same manner as above, except that a mixture of the Li$_2$FeS$_2$ and the solid electrolyte powder obtained above at a weight ratio of 1:1 was used as the material for negative electrode.

Figure 2:
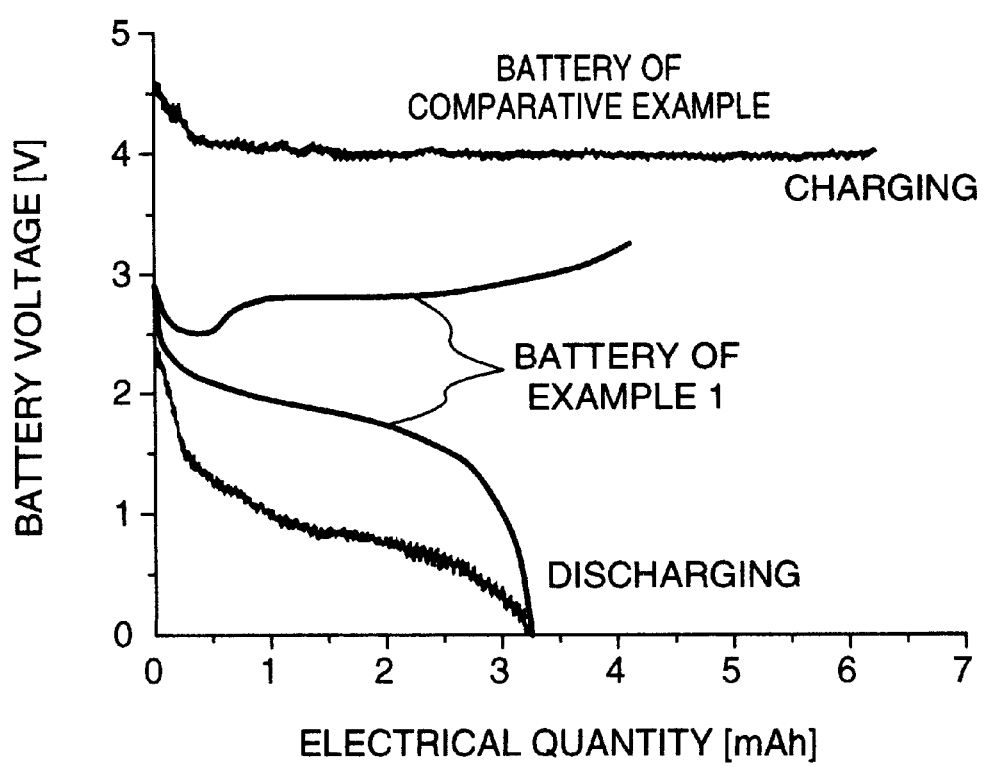
FIG. 2 is a graph which shows charge and discharge curve of the totally-solid lithium secondary battery.

These batteries A and B were evaluated on charging and discharging behavior. FIG. 2 shows a charge and discharge curve at the first cycle in a test conducted at a charging and discharging current of 450 μA. In FIG. 2, an abnormality in the charging and discharging behavior is seen in the comparative totally-solid lithium secondary battery. In this comparative totally-solid lithium secondary battery, the battery voltage exceeded 4 V just after charging, and it is considered that metallic lithium was precipitated at the negative electrode.

On the other hand, in the battery of the present invention, normal charging and discharging could be performed. From these results, it can be seen that a totally-solid lithium secondary battery excellent in charge and discharge characteristics was obtained in this example of the present invention.

Example 2

In this example, a totally-solid lithium secondary battery was made in the same manner as in Example 1, except that a transition metal chalcogenide represented by FeS$_2$ was used in place of the lithium·transition metal chalcogenide represented by Li$_2$FeS$_2$ as the first transition metal chalcogenide, and the characteristics of the resulting battery were evaluated.

FeS$_2$ used was a commercially available reagent. A totally-solid lithium secondary battery of the present invention and a comparative totally-solid lithium secondary battery were made in the same manner as in Example 1, except that $FeS_2$ was used in place of $Li_2FeS_2$, and weight of the negative electrode was 16 mg.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 3

In this example, a totally-solid lithium secondary battery was made in the same manner as in Example 1, except that a lithium•transition metal chalcogenide represented by $LiTiS_2$ was used in place of the transition metal chalcogenide represented by $TiS_2$ as the second transition metal chalcogenide, and the characteristics of the resulting battery were evaluated in the same manner as in Example 1.

The transition metal chalcogenide represented by $LiTiS_2$ was prepared in the following manner. First, $TiS_2$ which was a commercially available reagent was added to a solution of n-butyl lithium (n-BuLi) in hexane at a molar ratio of $TiS_2$:n-BuLi=1:1, and the mixture was left to stand for 3 days at room temperature. Then, this mixture was filtered to obtain a lithium•transition metal chalcogenide represented by $LiTiS_2$.

A totally-solid lithium secondary battery of the present invention and a comparative totally-solid lithium secondary battery were made in the same manner as in Example 1, except that $LiTiS_2$ was used in place of $TiS_2$.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 4

In this example, a totally-solid lithium secondary battery was made in the same manner as in Example 1, except that a lithium•transition metal chalcogenide represented by $Li_2CoS_2$ was used in place of the lithium•transition metal chalcogenide represented by $Li_2FeS_2$ as the first transition metal chalcogenide, and $MoS_2$ was used in place of $TiS_2$ as the second transition metal chalcogenide, and the characteristics of the resulting battery were evaluated.

The lithium•transition metal chalcogenide represented by $Li_2CoS_2$ was prepared by mixing CoS and $Li_2S$ at a molar ratio of 1:1, charging the mixture in a glassy carbon crucible, and heating the mixture at 650° C. in an argon stream.

$MoS_2$ used was a commercially available reagent.

A totally-solid lithium secondary battery of the present invention was made in the same manner as in Example 1, except that the above $Li_2CoS_2$ and $MoS_2$ were used and a comparative totally-solid lithium secondary battery was made in the same manner as in Example 1, except that the above $Li_2CoS_2$ was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 5

In this example, a totally-solid lithium secondary battery was made in the same manner as in Example 1, except that a lithium•transition metal chalcogenide represented by $Li_2NiS_2$ was used in place of the lithium•transition metal chalcogenide represented by $Li_2FeS_2$ as the first lithium•transition metal chalcogenide, and $NbS_2$ was used as the second transition metal chalcogenide, and the characteristics of the resulting battery were evaluated.

The lithium•transition metal chalcogenide represented by $Li_2NiS_2$ was prepared by mixing NiS and $Li_2S$ at a molar ratio of 1:1, charging the mixture in a glassy carbon crucible, and heating the mixture at 650° C. in an argon stream.

$NbS_2$ used was a commercially available reagent.

A totally-solid lithium secondary battery of the present invention was made in the same manner as in Example 1, except that the above $Li_2NiS_2$ and $NbS_2$ were used and a comparative totally-solid lithium secondary battery was made in the same manner as in Example 1, except that the above $Li_2NiS_2$ was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 6

In this example, a totally-solid lithium secondary battery was made in the same manner as in Example 1, except that a sulfide-based lithium ion conductive solid electrolyte represented by $0.05Li_4SiO_4$-$0.60Li_2S$-$0.35SiS_2$ was used in place of the amorphous solid electrolyte represented by $0.01Li_3PO_4$-$0.63Li_2S$-$0.36SiS_2$ as the electrolyte, and the characteristics of the battery were evaluated.

The sulfide-based lithium ion conductive solid electrolyte represented by $0.05Li_4SiO_4$-$0.60Li_2S$-$0.35SiS_2$ was prepared in the same manner as in Example 1, except that a mixture of lithium orthosilicate ($Li_4SiO_4$), lithium sulfide and silicon sulfide at a molar ratio of 5:60:35 was used as the mixture of starting materials.

A totally-solid lithium secondary battery of the present invention and a comparative totally-solid lithium secondary battery were made in the same manner as in Example 1, except that the electrolyte obtained above was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was be obtained in this example of the present invention.

Example 7

In this example, a totally-solid lithium secondary battery was made in the same manner as in Example 1, except that a sulfide-based lithium ion conductive solid electrolyte represented by $0.05Li_2O\text{-}0.60Li_2S\text{-}0.35SiS_2$ was used in place of the amorphous solid electrolyte represented by $0.01Li_3PO_4\text{-}0.63Li_2S\text{-}0.36SiS_2$ as the electrolyte, and the characteristics of the battery were evaluated.

The sulfide-based lithium ion conductive solid electrolyte represented by $0.05Li_2O\text{-}0.60Li_2S\text{-}0.35SiS_2$ was prepared in the same manner as in Example 1, except that a mixture of lithium oxide ($Li_2O$), lithium sulfide and silicon sulfide at a molar ratio of 5:60:35 was used as the mixture of starting materials.

A totally-solid lithium secondary battery of the present invention and a comparative totally-solid lithium secondary battery were made in the same manner as in Example 1, except that the electrolyte obtained above was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was be obtained in this example of the present invention.

Example 8

In this example, a totally-solid lithium secondary battery was made in the same manner as in Example 1, except that a sulfide-based lithium ion conductive solid electrolyte represented by $0.6Li_2S\text{-}0.4SiS_2$ was used in place of the amorphous solid electrolyte represented by $0.01Li_3PO_4\text{-}0.63Li_2S\text{-}0.36SiS_2$ as the electrolyte, and the characteristics of the battery were evaluated.

The sulfide-based lithium ion conductive solid electrolyte represented by $0.6Li_2S\text{-}0.4SiS_2$ was prepared in the same manner as in Example 1, except that a mixture of lithium sulfide and silicon sulfide at a molar ratio of 6:4 was used as the mixture of starting materials.

A totally-solid lithium secondary battery of the present invention and a comparative totally-solid lithium secondary battery were made in the same manner as in Example 1, except that the electrolyte obtained above was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 9

In this example, a totally-solid lithium battery was made in the same manner as in Example 1, except that a lithium ion conductive amorphous solid electrolyte represented by $0.6Li_2S\text{-}0.4P_2S_5$ which was one of the sulfide-based lithium ion conductive solid electrolytes was used in place of the amorphous solid electrolyte represented by $0.01Li_3PO_4\text{-}0.63Li_2S\text{-}0.36SiS_2$ as the electrolyte, and the characteristics of the battery were evaluated.

First, lithium sulfide ($Li_2S$) and phosphorus sulfide ($P_2S_5$) as starting materials were mixed at a molar ratio of 3:2. This mixture was enclosed in a quartz tube and molten at 900° C., and this quartz tube was introduced into water to rapidly cool the mixture, thereby obtaining an amorphous solid electrolyte represented by $0.6Li_2S\text{-}0.4P_2S_5$.

A totally-solid lithium secondary battery of the present invention and a comparative totally-solid lithium secondary battery were made in the same manner as in Example 1, except that the thus obtained electrolyte was used.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

Example 10

In this example, a totally-solid lithium secondary battery was made in the same manner as in Example 1, except that lithium nickel oxide ($LiNiO_2$) was used as the active material for positive electrode, and the characteristics of the battery were evaluated.

First, $LiNiO_2$ was prepared by mixing nickel oxide (NiO) and lithium hydroxide and heating the mixture at 800° C. in the air.

A totally-solid lithium secondary battery of the present invention and a comparative totally-solid lithium secondary battery were made in the same manner as in Example 1, except that $LiNiO_2$ was used in place of $LiCoO_2$.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally solid lithium secondary battery excellent in charge and discharge characteristics was obtained in this example of the present invention.

Example 11

In this example, a totally-solid lithium secondary battery was made in the same manner as in Example 1, except that lithium manganese oxide ($LiMn_2O_4$) was used as the active material for positive electrode, and the characteristics of the battery were evaluated.

$LiMn_2O_4$ was prepared by mixing lithium carbonate ($Li_2CO_3$) and manganese acetate ($Mn(CH_3COO)_2$) and heating the mixture at 750° C. in the air.

A totally-solid lithium secondary battery of the present invention and a comparative totally-solid lithium secondary battery were made in the same manner as in Example 1, except that $LiMn_2O_4$ obtained above was used in place of $LiCoO_2$.

These totally-solid lithium secondary batteries were evaluated on charging and discharging behavior in the same manner as in Example 1. The totally-solid lithium secondary battery of the present invention showed normal charging and discharging behavior while the comparative totally-solid lithium secondary battery showed abnormal charging and discharging behavior.

As can be seen from these results, a totally-solid lithium secondary battery excellent in charge and discharge characteristics was obtained in this example of the present invention.

In the above examples of the present invention, explanation has been made only on sulfides as the transition metal chalcogenides or lithium•transition metal chalcogenides. However, the similar effects can be obtained using selenides such as $VSe_2$ and $TiSe_2$, tellurides, and the like, and the present invention is not limited to only the sulfides as the transition metal chalcogenides or lithium•transition metal chalcogenides. Furthermore, as for the transition metal elements, the similar effects can be obtained using chalcogenides containing two or more transition metal elements, such as $Fe_{1-x}Co_xS_2$.

Moreover, as for active materials for positive electrode, the similar effects can be obtained using lithium•transition metal oxides such as $LiMnO_2$, $LiNi_{0.5}Mn_{0.5}O_4$, $LiCr_{0.8}Mn_{0.2}O_4$, $LiNiVO_4$, and $LiCoPO_4$, and transition metal sulfides which have not been explained in the examples.

Furthermore, in the examples of the present invention, only the $Li_2S$—$SiS_2$ type has been explained as the lithium ion conductive inorganic solid electrolytes, but the similar effects can be obtained using other sulfide-based solid electrolytes such as $Li_2S$—$Al_2S_3$, and oxide-based solid electrolytes such as $Li_2O$—$SiO_2$, $Li_2O$—$SiO_2$—$P_2O_5$, $Li_{0.5-3x}RE_{0.5+x}TiO_3$ (RE=La, Pr, Nd) which have not been explained in the examples.

As explained above, totally-solid lithium secondary batteries excellent in charge and discharge characteristics in which the electrolyte is mainly composed of a lithium ion conductive inorganic solid electrolyte can be obtained when the negative electrode contains a first transition metal chalcogenide or lithium•transition metal chalcogenide and a second transition metal chalcogenide or lithium•transition metal chalcogenide, and the second transition metal chalcogenide or lithium•transition metal chalcogenide performs an oxidation-reduction reaction of a potential lower than the oxidation-reduction potential shown by the first transition metal chalcogenide or lithium•transition metal chalcogenide, or the second transition metal chalcogenide or lithium•transition metal chalcogenide shows a mixed conductivity of electron-lithium ion in the operation of charging and discharging of the totally-solid lithium secondary battery.

Having thus described the present invention, it is readily apparent that various modifications can be made by those who are skilled in the art without departing from the scope of the present invention. It is intended that the invention embraces these equivalents within the scope of the claims that follow.

What is claimed is:

1. A totally-solid lithium secondary battery which comprises a positive electrode, an electrolyte comprising mainly a sulfide based lithium ion conductive inorganic solid electrolyte comprising mainly a sulfide, and a negative electrode containing (a) at least one first transition metal chalcogenide or lithium transition metal chalcogenide and (b) at least one second transition metal chalcogenide or lithium transition metal chalcogenide, and in which oxidation-reduction potential of said second transition metal chalcogenide or lithium transition metal chalcogenide is lower than that of said first transition metal chalcogenide or lithium transition metal chalcogenide in the operation of charging and discharging of the totally-solid lithium secondary battery.

2. A totally-solid lithium secondary battery according to claim 1, wherein the transition metal of the first transition metal chalcogenide or lithium•transition metal chalcogenide is at least one metal selected from the group consisting of iron, cobalt and nickel.

3. A totally-solid lithium secondary battery according to claim 2, wherein when the first lithium transition metal chalcogenide is represented by $Li_xMeX_y$, wherein Li is lithium, Me is at least one metal selected from the group consisting of iron, cobalt and nickel, X is chalcogen, and x and y are numerals corresponding to the compositional ratio of said constituents Li and X, respectively, the minimum formal charge (n) of the metal during the operation of the lithium secondary battery satisfies $+2 \geq n \geq 0$, with a proviso that the formal charge of the chalcogen is −2 and the formal charge of lithium is +1.

4. A totally-solid lithium secondary battery according to claim 1, wherein the transition metal of the second transition metal chalcogenide or lithium•transition metal chalcogenide is at least one metal selected from the group consisting of vanadium, titanium, chromium, molybdenum, niobium and manganese.

5. A totally-solid lithium secondary battery according to claim 1, wherein the chalcogen element is sulfur.

6. A totally-solid lithium secondary battery according to claim 1, wherein the sulfide-based lithium ion conductive solid electrolyte has a bridging oxygen.

7. A totally-solid lithium secondary battery according to claim 1, wherein an active material for the positive electrode is a lithium-containing transition metal oxide.

8. A totally-solid lithium secondary battery which comprises a positive electrode, an electrolyte comprising mainly a sulfide based lithium ion conductive inorganic solid electrolyte comprising mainly a sulfide, and a negative electrode containing (a) at least one first transition metal chalcogenide or lithium transition metal chalcogenide and (b) at least one second transition metal chalcogenide or lithium transition metal chalcogenide, and in which said first transition metal chalcogenide or lithium transition metal chalcogenide performs an oxidation-reduction reaction and said second transition metal chalcogenide or lithium-transition metal chalcogenide shows a mixed conductivity of electron-lithium ion in the operation of charging and discharging of the totally-solid lithium secondary battery.

9. A totally-solid lithium secondary battery according to claim 8, wherein the transition metal of the first transition metal chalcogenide or lithium transition metal chalcogenide is at least one metal selected from the group consisting of iron, cobalt and nickel.

10. A totally-solid lithium secondary battery according to claim 9, wherein when the first lithium transition metal chalcogenide is represented by $Li_xMeX_y$, wherein Li is lithium, Me is at least one metal selected from the group consisting of iron, cobalt and nickel, X is chalcogen, and x and y are numerals corresponding to the compositional ratio of said constituents Li and X, respectively, the minimum formal charge (n) of the metal during the operation of the lithium secondary battery satisfies $+2 \geq n \geq 0$, with a proviso that the formal charge of the chalcogen is −2 and the formal charge of lithium is +1.

11. A totally-solid lithium secondary battery according to claim 8, wherein the transition metal of the second transition metal chalcogenide or lithium transition metal chalcogenide is at least one metal selected from the group consisting of vanadium, titanium, chromium, molybdenum, niobium and manganese.

12. A totally-solid lithium secondary battery according to claim 8, wherein the chalcogen element is sulfur.

13. A totally-solid lithium secondary battery according to claim 8, wherein the sulfide-based lithium ion conductive solid electrolyte has a bridging oxygen.

14. A totally-solid lithium secondary battery according to claim 8, wherein an active material for the positive electrode is a lithium-containing transition metal oxide.

* * * * *